Patented July 25, 1944

2,354,233

UNITED STATES PATENT OFFICE 2,354,233

1-METHYLBARBITURIC ACID DERIVATIVES AND THEIR SALTS

Lewis A. Walter, East Orange, N. J., assignor to The Maltbie Chemical Company, Newark, N. J., a corporation of New Jersey No Drawing. Application February 28, 1942, Serial No. 432,890

20 Claims. (Cl. 260—257)

The present invention relates to certain new and useful 5,5 disubstituted 1-methylbarbituric acids, and their salts, having the formula:

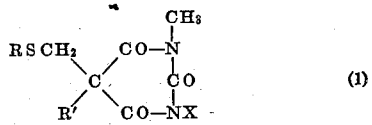

wherein R and R' are hydrocarbon groups, either saturated or unsaturated, and either the same or different, and each of which contains not more than six carbon atoms, and wherein the sum of the carbon atoms in R and R' does not exceed 10, it being understood that R has a carbon atom attached directly to the sulfur of the thiomethylene group and R' has a carbon atom attached directly to the carbon atom forming the barbituric acid nucleus; and wherein X is a member selected from the group consisting of hydrogen, alkalimetal, an equivalent of alkaline earth metal, ammonium, monoalkyl ammonium, dialkyl ammonium, alkanol ammonium and an equivalent of alkylene diammonium.

These novel 1-methylbarbituric acid compounds and their salts, when tested pharmacologically, have been found to possess useful and valuable hypnotic and sedative properties, making them valuable for many medical purposes. The compounds are, in general, white, and are generally crystalline solids.

As at present advised, what is in general a preferred procedure for preparation of my novel 1-methylbarbituric acids from disubstituted malonic esters is described below; but other methods of synthesis may also be used, such as, for example, by using the disubstituted cyano acetic ester instead of the disubstituted malonic ester. The former method of synthesis is illustrated as follows:

A disubstituted malonic ester (such as may be prepared, for example, in accordance with application Serial No. 432,887, filed February 28, 1942) is condensed with N-methylurea in the presence of sodium ethylate in an organic solvent such as, for example, absolute alcohol, under conditions such as those hereafter specifically illustrated. When the reaction is completed, the solvent is removed by vacuum distillation and the residue is dissolved in water. The aqueous solution is then extracted with ether, and is separated from the ether layer and acidified, yielding a precipitate of the desired 1-methylbarbituric acid, which may then be filtered off and purified by crystallization from a suitable solvent such as ethanol.

The following specific examples are illustrative of the novel compounds according to my invention, and of their preparation:

EXAMPLE 1

*1-methyl-5-ethylthiomethylene-5-methyl barbituric acid*

To 1.1 moles of sodium, dissolved in 500 cc. of absolute alcohol, and 1.0 mole of ethylthiomethylene methyl malonic ester, 1.1 moles of methylurea are added. This mixture is refluxed on a steam bath for about 12 hours, the alcohol is removed by vacuum distillation, and the residue is dissolved in about 600 cc. of water. The resulting aqueous solution is then extracted with ether, and the aqueous layer is separated and acidified, yielding a precipitate of 1-methyl-5-ethylthiomethylene-5-methyl barbituric acid, which is then filtered off and purified by crystallization from alcohol. The product has a melting point of approximately 104–105° C. (uncorrected), and is represented by the following formula:

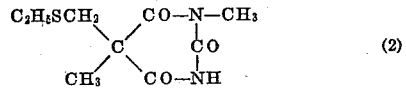

EXAMPLE 2

*1-methyl-5-ethylthiomethylene-5-isopropyl barbituric acid*

To 1.1 moles of sodium, dissolved in 500 cc. of absolute alcohol, and 1.0 mole of ethylthiomethylene isopropyl malonic ester, 1.1 moles of methylurea are added. The mixture is refluxed on a steam bath for about 12 hours, the alcohol is removed by vacuum distillation, and the residue is dissolved in about 600 cc. of water. The resulting aqueous solution is extracted with ether and the aqueous layer is separated and acidified, yielding a precipitate of 1-methyl-5-ethylthiomethylene-5-isopropyl barbituric acid, which is then filtered off and purified by crystallization from alcohol. The product has a melting point of approximately 78–79° C. (uncorrected), and is represented by the following formula:

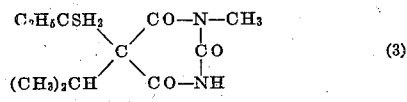

EXAMPLE 3

*1-methyl-5-isopropylthiomethylene-5-ethyl barbituric acid*

To 1.1 moles of sodium, dissolved in 500 cc. of absolute alcohol, and 1.0 mole of isopropyl-thiomethylene ethyl malonic ester, 1.1 moles of methylurea are added. The mixture is refluxed on a steam bath for about 12 hours, the alcohol is removed by vacuum distillation, and the residue is dissolved in about 600 cc. of water. The resulting aqueous solution is extracted with ether, and the aqueous layer is separated and acidified, yielding a precipitate of 1-methyl-5-isopropyl-thiomethylene-5-ethyl barbituric acid, which is then filtered off and purified by crystallization from alcohol. The product has a melting point of approximately 87–88.5° C. (uncorrected), and is represented by the following formula:

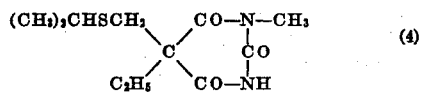   (4)

Example 4

*1-methyl-5-n-butylthiomethylene-5-methyl barbituric acid*

To 1.1 moles of sodium, dissolved in 500 cc. of absolute alcohol, and 1.0 mole of n-butylthiomethylene methyl malonic ester, 1.1 moles of methylurea are added. The mixture is refluxed on a steam bath for about 12 hours, the alcohol is removed by vacuum distillation, and the residue is dissolved in about 600 cc. of water. The resulting aqueous solution is extracted with ether, and the aqueous layer is separated and acidified, yielding a precipitate of 1-methyl-5-n-butylthiomethylene-5-methyl barbituric acid, which is then filtered off and purified by crystallization from alcohol. The product has a melting point of approximately 75–77° C. (uncorrected), and is represented by the following formula:

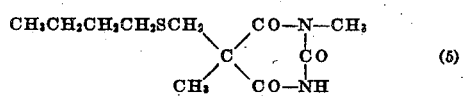   (5)

From the foregoing examples, which are merely illustrative of the scope of my invention, as regards the novel 1-methylbarbituric acids, it will be observed that the substituent groups R and R', as defined above, are capable of considerable variation within those limits, while producing good results and useful and valuable compounds. By way of further illustration, the following 1-methylbarbituric acids, which, by way of summary, include the examples given above, are among those which I have prepared, and which, when tested pharmacologically, were found to possess useful hypnotic or sedative properties, the following list being illustrative and not exclusive:

1-methylbarbituric acid

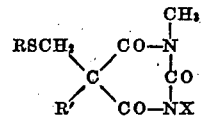

wherein:

| R is— | R' is— | Approximate melting point, °C. (uncorrected) |
|---|---|---|
| Ethyl | Methyl | 104–105 |
| Do | Ethyl | 66.5– 67.5 |
| Do | n-Propyl | 102–104 |
| Do | Isopropyl | 78– 79 |
| Do | Isobutyl | 103–104 |
| Do | Secondary-butyl | 75– 79 |
| Do | Allyl | 63– 65.5 |
| Propyl | Ethyl | 73– 75 |
| Isopropyl | do | 87– 88.5 |
| Butyl | Methyl | 75– 77 |

Salts of the Novel 1-Methylbarbituric Acid Derivatives

Many sodium salts of the 1-methylbarbituric acids described above may be prepared by dissolving 1 mole of the disubstituted 1-methylbarbituric acid in the minimum quantity of hot absolute alcohol and adding a solution containing one equivalent of sodium in absolute alcohol. On cooling, or on evaporation of the alcohol, the sodium salt separates as crystals, or in amorphous form. In some instances a syrup results and this material, when stirred with dry ether, gives the sodium salt in amorphous form.

Other alkali-metal salts may also be derived by a similar procedure.

The sodium salts of my novel 1-methylbarbituric acid derivatives have been found to be readily soluble in water, and their aqueous solutions are alkaline in reaction. When administered orally or hypodermically in proper dosage they are good and useful hypnotics or sedatives, and range in duration of action from long to ultra-short acting.

Calcium salts may be prepared by treating an absolute alcohol solution of the sodium salt with the metathetical amount of alcoholic calcium chloride, filtering off the precipitated sodium chloride and concentrating the alcoholic solution to yield the calcium salt.

The ammonium, alkyl and alkanol ammonium salts may be prepared by dissolving the corresponding 1-methylbarbituric acid in an excess of ammonia or amine and subsequently removing the excess quantity of base.

In the following claims it is to be understood that "1-methylbarbituric acid derivative" and similar expressions, includes, also, the salts of such derivatives, such as, for example, the salts described above.

The examples given above, and illustrative processes for their production, include the best embodiments of my present invention now known to me; but it is to be understood that the invention is not necessarily or specifically limited thereto and may, under proper conditions, have other embodiments, produced in other ways, without departure from the spirit of the invention, and within the scope of the following claims.

I claim:

1. As a new and useful composition of matter, a 5,5 disubstituted 1-methylbarbituric acid derivative having the formula:

$$\begin{array}{c} \text{RSCH}_2 \\ \diagdown \\ \text{C} \\ \diagup \\ \text{R}' \end{array} \begin{array}{c} \text{CH}_3 \\ | \\ \text{CO—N} \\ | \\ \text{CO} \\ | \\ \text{CO—NX} \end{array}$$

wherein R and R' are hydrocarbon groups, each of which contains not more than six carbon atoms, and wherein the sum of the carbon atoms in R and R' does not exceed 10, R has a carbon atom attached directly to the sulfur of the thiomethylene group, and R' has a carbon atom attached directly to the carbon atom forming the barbituric acid nucleus; and wherein X is a member selected from the group consisting of hydrogen, alkali-metal, an equivalent of alkaline earth metal, ammonium, monoalkyl ammonium, dialkyl ammonium, alkanol ammonium, and an equivalent of alkylene diammonium.

2. A composition of matter according to claim 1 in which X represents hydrogen.

3. A composition of matter according to claim 1 in which at least one of the R and R' groups is a primary hydrocarbon group.

4. A composition of matter according to claim 1 in which at least one of the R and R' groups is a primary hydrocarbon group and X represents hydrogen.

5. A composition of matter according to claim 1 in which R is a primary hydrocarbon group.

6. A composition of matter according to claim 1 in which R is a primary hydrocarbon group and R' is a saturated hydrocarbon group.

7. A composition of matter according to claim 1 in which R is a primary hydrocarbon group, R' is a saturated hydrocarbon group, and X represents hydrogen.

8. A composition of matter according to claim 1 in which R is a primary hydrocarbon group and X represents hydrogen.

9. A composition of matter according to claim 1 in which R' is a primary hydrocarbon group.

10. A composition of matter according to claim 1 in which R' is a primary hydrocarbon group and X represents hydrogen.

11. A composition of matter according to claim 1 in which R and R' are both primary hydrocarbon groups.

12. A composition of matter according to claim 1 in which R and R' are both primary hydrocarbon groups and X represents hydrogen.

13. A composition of matter according to claim 1 in which R is a primary hydrocarbon group and R' is a secondary hydrocarbon group.

14. A composition of matter according to claim 1 in which R is a primary hydrocarbon group, R' a secondary hydrocarbon group, and X represents hydrogen.

15. A composition of matter according to claim 1 in which R is a secondary hydrocarbon group and R' is a primary hydrocarbon group.

16. A composition of matter according to claim 1 in which R is a secondary hydrocarbon group, R' a primary hydrocarbon group, and X represents hydrogen.

17. 5-ethylthiomethylene-5-isobutyl 1-methylbarbituric acid.

18. 5-ethylthiomethylene-5-secondary butyl 1-methylbarbituric acid.

19. 5-isopropylthiomethylene-5-ethyl 1-methylbarbituric acid.

20. The process of producing a 5,5 disubstituted 1-methylbarbituric acid derivative according to claim 1, which comprises condensing a corresponding disubstituted malonic ester with N-methylurea in the presence of sodium ethylate in an organic solvent.

LEWIS A. WALTER.

CERTIFICATE OF CORRECTION.

Patent No. 2,354,233.                                                          July 25, 1944.

LEWIS A. WALTER.

It is hereby certified that error appears in the printed specification of the above numbered patent requiring correction as follows: Page 1, second column, line 46, Example 2, for that portion of the formula reading "$C_2H_5CSH_2$" read --$C_2H_5SCH_2$--; and that the said Letters Patent should be read with this correction therein that the same may conform to the record of the case in the Patent Office.

Signed and sealed this 14th day of November, A. D. 1944.

(Seal)

Leslie Frazer
Acting Commissioner of Patents.